United States Patent
Hara et al.

(10) Patent No.: US 6,386,984 B1
(45) Date of Patent: May 14, 2002

(54) AMUSEMENT FACILITIES, VEHICLES FOR AMUSEMENT FACILITIES, AND DISPLAY FOR AMUSEMENT FACILITIES

(75) Inventors: Yoshiteru Hara; Kenichiro Hayashi; Kazuhide Arai, all of Tokyo; Tatsuya Kono, Kawasaki; Hiroshi Uemura; Hiroki Ito, both of Tokyo, all of (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/284,901
(22) PCT Filed: Aug. 25, 1998
(86) PCT No.: PCT/JP98/03769
  § 371 Date: Aug. 11, 1999
  § 102(e) Date: Aug. 11, 1999
(87) PCT Pub. No.: WO99/10064
  PCT Pub. Date: Mar. 4, 1999

(30) Foreign Application Priority Data

Aug. 25, 1997 (JP) .............................................. 9-228473

(51) Int. Cl.⁷ .............................................. A63G 31/16
(52) U.S. Cl. ............................ 472/60; 472/130; 434/55
(58) Field of Search .............................. 472/59, 60, 61, 472/130; 434/29, 55, 38, 58

(56) References Cited

U.S. PATENT DOCUMENTS

| | | | | |
|---|---|---|---|---|
| 4,251,140 A | * | 2/1981 | Fogerty, Jr. ............... | 472/60 X |
| 5,499,920 A | * | 3/1996 | Trumbull ..................... | 434/69 |
| 5,507,647 A | * | 4/1996 | Morris ........................ | 434/55 |
| 5,711,670 A | * | 1/1998 | Barr ............................ | 434/55 |
| 5,716,281 A | * | 2/1998 | Dote ........................... | 472/60 |

* cited by examiner

*Primary Examiner*—Kien T. Nguyen
(74) *Attorney, Agent, or Firm*—Keating & Bennett, LLP

(57) ABSTRACT

Amusement facilities for providing predetermined images to passengers inside a vehicle for amusement on the basis of a scenario while the vehicle (ride)(1) is moving in a predetermined course, wherein the course includes bright areas and dark areas, and acceleration/deceleration of the ride (1) is done at the boundaries of these areas. A video camera (11) provides images outside the vehicle to the passengers in the bright areas and images of a video disk player (34) are provided to the passengers in the dark areas. Further, sways are imparted by a motor (23) for rolling and a motor (24) for pitching to the ride (1) in accordance with scenarios. These images, acceleration/deceleration and sway give the passengers an illusion as if they had moved over a longer distance than an actual distance in the dark areas.

18 Claims, 7 Drawing Sheets

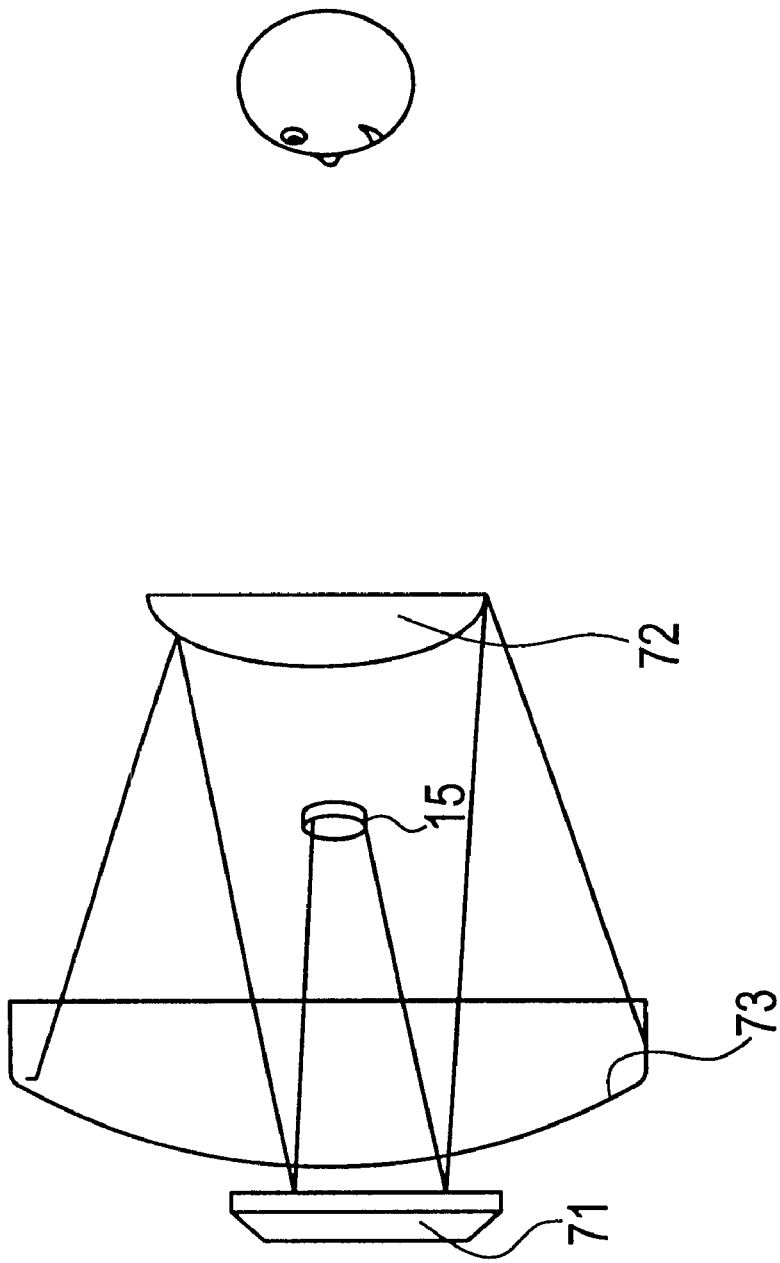

AMUSEMENT FACILITIES, VEHICLES FOR AMUSEMENT FACILITIES, AND DISPLAY FOR AMUSEMENT FACILITIES

TECHNICAL FIELD

The present invention relates to an amusement facility of the type in which a rider enjoys riding on a ride, and an amusement facility ride and amusement facility display device thereof, capable of providing a rider with ambiance that exceeds reality, affording greater satisfaction.

BACKGROUND ART

In recent years, an amusement facility of the type at which [a rider] can enjoy playing a computer game while riding on a small-scale ride has become increasingly popular among young people.

At an amusement facility of this type, [a rider] is looking for a thrill resulting from high ambiance. For example, rides such as jet coasters are operated at highspeed, and incorporate acceleration and oscillation.

However, this approach requires a large site, increasingly higher equipment and construction expenses, and costs that inevitably rise.

Accordingly, an object of the present invention is to attempt to solve for these problems by providing an amusement facility, amusement facility ride, and amusement facility display device, which, despite being low cost, is capable of satisfying a rider with high ambiance.

SUMMARY OF THE INVENTION

The present invention relates to an amusement facility, and an amusement ride for riders which moves along a previously-determined. A predetermined image, based, for example, on a previously-determined scenario, is provided to a rider inside the above-mentioned amusement ride, the above-mentioned course has a first area and a second area. In the above-mentioned first area, a rider is provided with an image of outside the above-mentioned amusement ride, and in the above-mentioned second area, a rider is provided with a previously-determined image.

An amusement facility related to the present invention changes the speed of the above-mentioned amusement ride in the above-mentioned first area and the above-mentioned second area in accordance with accelerating the above-mentioned amusement ride when it is in the above-mentioned first area, and decelerating the above-mentioned amusement ride when it transitions from the above-mentioned first area to the above-mentioned second area.

For example, 0.1 m/s and 0.7 m/s can be the pre-and post-acceleration speeds on a course of an amusement facility related to the present invention. These speeds are appropriately set in accordance with the pertinent amusement facility. For example, these speeds are set on the basis of the size of the amusement facility, site and/or construction costs, the duration of each ride, the type of rider being targeted (young people, families, or children), the relation with the scenario of the provided image, and the movement of the ride. For example, attempting to increase amusement riding time in spite of the fact that an amusement facility is relatively small will result in slower speeds, and if the imaged scenario is relatively long, the speed in the second area becomes slower. Further, when the difference in speed between the first area and the second area is slight, the effects that change the environment in accordance with the scenario are fewer.

Conversely, when this difference is great, a sense of inconsistency is imparted to a rider. With regard to this point, this feeling can be avoided by suitably setting the provided image, and scenario thereof. Further, this feeling can also be avoided by using the environment, and the movement and rocking of the ride.

As for the amusement facility related to the present invention, the difference between the speed of the above-mentioned first area and the speed of the above-mentioned second area, and the level of the above-mentioned acceleration, and the level of deceleration are set so that a rider is given the impression that the distance traveled is longer than the actual distance in the above-mentioned second area.

As for the level of speed, acceleration and deceleration, this speed is set in accordance with the pertinent amusement facility. For example, the is set on the basis of the size of the amusement facility, site and/or construction costs, the duration of each ride, the type of rider being targeted (young people, families, or children), the relation with the scenario of the provided image, and the movement of the ride. For example, causing a ride to rock as it decelerates makes it hard for a rider to detect the deceleration, thus making it possible to increase the level of deceleration. If a rider's attention can be diverted elsewhere in this manner, the level of deceleration can be increased. In addition, it is also possible to distract a rider's attention by acting on his sense of sight (providing an image that will attract his attention, or suddenly displaying an image of the enemy), sense of hearing (playing music/sound effects at high volume), sense of touch (blowing air, or splashing water on a rider) and other senses. An amusement facility related to the present invention accelerates the above-mentioned amusement ride when returning to the above-mentioned first area from the above-mentioned second area.

An amusement facility related to the present invention provides between the above-mentioned first area and the above-mentioned second area, a door, which opens when the above-mentioned amusement ride approaches, and the above-mentioned amusement ride passes through the above-mentioned door when transitioning from the above-mentioned first area to the above-mentioned second area.

As for an amusement facility related to the present invention, the above-mentioned first area is an area, wherein a rider can acquire visual information from the outside world, and the above-mentioned second area is an area, wherein a rider cannot acquire visual information from the outside world.

For example, there is a constitution, in which a ride does not have a window, and a rider cannot see directly outside, but can only see the outside via a display inside thereof. Or, there is a constitution, in which the window of the ride, or a blind, opens and closes at the border of the areas. In this case, because the rider riding in the ride is unable to see the outside world, a light can be provided on the covered inside to make it bright. Shutting a rider off from information from the outside world in this manner makes it possible to achieve a desired effect (for example, making a rider feel like he has traveled a longer distance than the actual distance).

As for an amusement facility related to the present invention, the above-mentioned first area is bright enough that a rider can discern the outside world, and the above-mentioned second area is so dark that a rider cannot discern the outside world.

In the dark area, the course is covered by a wall/blackout curtain.

As for an amusement facility related to the present invention, the above-mentioned first area is an area, in which the above-mentioned amusement ride can be seen by a third party (for example, visitors to this amusement facility, or people accompanying a rider), and the above-mentioned second area is an area, in which the above-mentioned amusement ride cannot be seen by a third party. An amusement facility ride related to the present invention is provided so as to travel parallel to a signal wire, and comprises a receiving device for receiving in a non-contact manner a modulated signal, a demodulator for demodulating a signal received by the above-mentioned receiving device, an amplifier for amplifying an image signal demodulated by the above-mentioned demodulator, and display means for receiving the output of the above-mentioned amplifier, and for displaying an image.

An amusement facility ride related to the present invention comprises a camera, which films the outside, and a switch, which selects either an image from the above-mentioned camera, or an image signal of the above-mentioned demodulator, and outputs the same to the above-mentioned amplifier.

An amusement facility ride related to the present invention comprises a driving device for self propulsion a, rolling device for rocking a rider from left to right relative to the direction of travel, and a pitching device for rocking a rider up and down relative to the direction of travel.

As for an amusement facility ride related to the present invention, the rolling axis of the above-mentioned rolling device slants downward toward the front.

As for an amusement facility ride related to the present invention, the pitching axis of the above-mentioned pitching device is located lower than a rider.

An amusement facility display device related to the present invention comprises a video projector, a screen for displaying an image projected by the above-mentioned video projector, and a concave mirror, which is provided in front of a rider, via which a rider views an image on the above-mentioned screen.

A for amusement facility display device related to the present invention, the above-mentioned screen forms a cylindrical surface.

As for an amusement facility display device related to the present invention, the above-mentioned concave mirror comprises a transparent layer, and a light-reflecting metallic layer, which is deposited on the surface thereof. The above-mentioned metallic layer is provided on the opposite side of the rider, and a rider receives light that passes through the above-mentioned transparent layer.

As to the transparent layer, an acrylic or other synthetic resin, or glass is used. As to the reflecting metallic layer, aluminum or the like is used.

As for an amusement facility display device related to the present invention, the transparent layer of the above-mentioned concave mirror is 5 mm thick. For example, a 5 mm-thick acrylic board is made to conform to a predetermined curved surface in accordance with blow molding, and a mirror is deposited on the backside thereof. As for the concave mirror, in addition to applying double-sided adhesive tape to the rim of the molded portion, the four corners thereof are secured by bolts.

An amusement facility display device related to the present invention comprises an auxiliary mirror between the above-mentioned video projector and the above-mentioned screen.

As for an amusement facility display device related to the present invention, the above-mentioned concave mirror is a shape, imitates the ride window.

As for an amusement facility display device related to the present invention, the line of sight of the rider relative to the above-mentioned concave mirror is practically horizontal.

Further, the invention related to this application is characterized in that the ride in the previously-described amusement facility comprises a body of equipment that is sealed relative to the outside so that a rider cannot directly see outside this ride. One aspect of this body of equipment has an image providing device which is constituted so that in the above-mentioned first area a rider is provided with an image taken by a camera or other photographing device of outside this body of equipment, and furthermore, so that in the above-mentioned second area a rider is provided with a game image.

BRIEF DESCRIPTION OF THE DRAWINGS

FIG. 7 is a top view of the projection optical system of a first aspect of the embodiment of the present invention.

DETAILED DESCRIPTION OF THE PREFERRED EMBODIMENT

A first aspect of the embodiment of the present invention is described hereinbelow using the figures. The first aspect of the embodiment of the present invention is a relatively large indoor amusement facility. Two riders ride in a small ride, and, while either watching an image projected on the inside thereof, or playing a game, experience in a simulated manner a trip and an adventure based on a previously-determined scenario. The course along which the ride moves is, for example, endless, and the trip and adventure thereof ends when the ride returns to the starting point. While the ride moves along the course, the ride rolls and pitches in synch with an image that accords with a scenario.

Therefore, a rider can have an experience brimming with ambiance and appeal.

Figure 1:
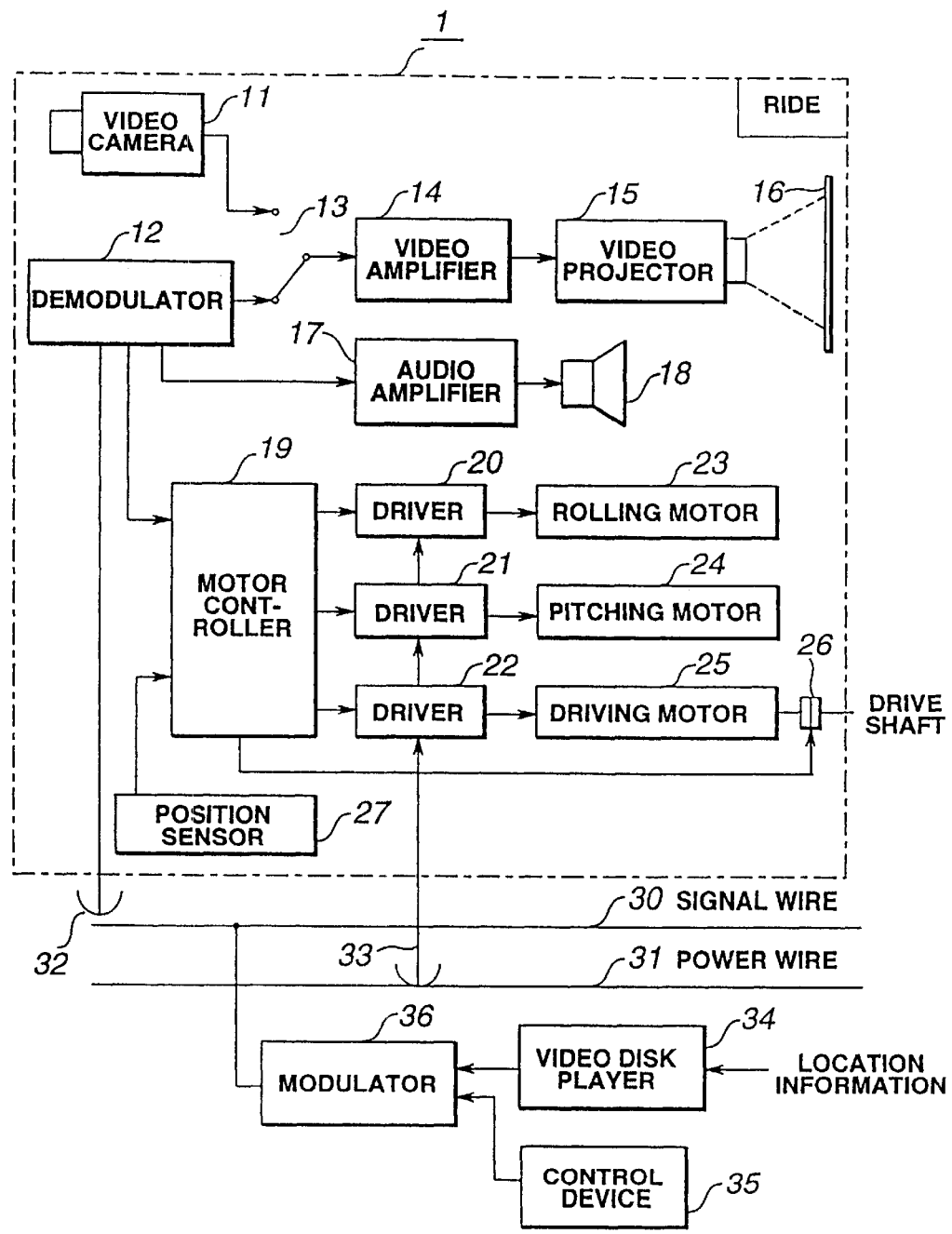
FIG. 1 is a functional block diagram of the electrical signal and control systems of a system of a first aspect of the embodiment of the present invention.

FIG. 1 is a diagram showing a functional block of the electrical signal and control systems within a system of a first aspect of the embodiment of the present invention. A ride 1 comprises, a video/audio signal system. The includes a video camera 11, which acquires an image of the direction of travel of the ride, A demodulator 12 receives a modulated video signal and an audio signal sent from a control booth installed outside the ride 1 and demodulates these signals. A switch 13, selects either an image signal from the video camera 11, or a video signal, which has been demodulated by the demodulator 12. The signal is sent to A video amplifier 14, a video projector 15, receives the video signal from the video amplifier 14, and projects an image on a screen 16. Finally an audio amplifier 17, receives and amplifies an audio signal, has been demodulated by the demodulator 12, and outputs the signal to a speaker 18.

Further, a ride 1, as a ride drive and attitude control apparatus, comprises a motor controller 19, which generates a motor drive signal based on a drive control signal and an attitude control signal from the demodulator 12, and a signal of a position sensor 27, which detects the location of tile ride 1 on the course, Drivers 20 through 22, drive a rolling motor 23, a pitching motor 24, and a ride 1 driving motor 25 based on respective control signals from the motor controller 19. A clutch 26, disconnects transmission to the driving motor 25 powered driving shaft. The motor controller 19 also controls the clutch 26. The motor controller causes the ride 1 to rock by making it roll and pitch in synch with the movement on the screen. A ride 1 receives via a signal receiver 32 image signals, audio signals, and control signals from a signal wire 30 (trolley) provided parallel to the course. This signal receiver 32 does not make contact with the signal wire. Because the image and other signals are modulated, the signal receiver 32 can receive the signals via induction. In this system, a plurality of rides 1 move around the course simultaneously. A different image must be sent to each of these rides 1. Even if the same image is used, the start timing will differ. Therefore, a plurality of images can be transmitted via a single trolley in accordance with modulating a plurality of channels relative to a plurality of rides 1. With this system, the signals of three channels can be sent via a single signal wire. Using two signal wires makes it possible to operate up to six rides. Further, a ride 1 obtains the required power in accordance with a collector 33, which makes contact with a power line 31. To send an image signal and so forth to a ride 1, a video disk player 34, which plays video based on ride 1 positional data, a controlling device 35, which controls how a ride is to rock in accordance with a displayed image, and a modulator 36, which modulates outputted signals from the video disk player 34 and the controlling device 35, and sends these signals to the signal wire 30, are provided within a system control booth. Modulation is carried out on a specific channel for each ride. The reason this system sends image and other signals to a ride from devices installed on the ground, and uses non-contact trolley transmission as the transmission method therefor is discussed here. When a video disk player is mounted to a ride, spindle vibration occurs in relation to ride vibration, making proper playback impossible. Then, when a video disk player is installed on the ground, the method of transmission becomes the problem. Using a wireless system can give rise to the problems of interference with other devices, as well as to legal or regulatory problems. Accordingly, the system employed was one that uses a probe, which detects a trolley wire signal in accordance with induction. With this method, since trolley wire leakage signals are detected by a probe placed relatively close thereto, modulator output can be limited, and problems do not arise.

Figure 2:
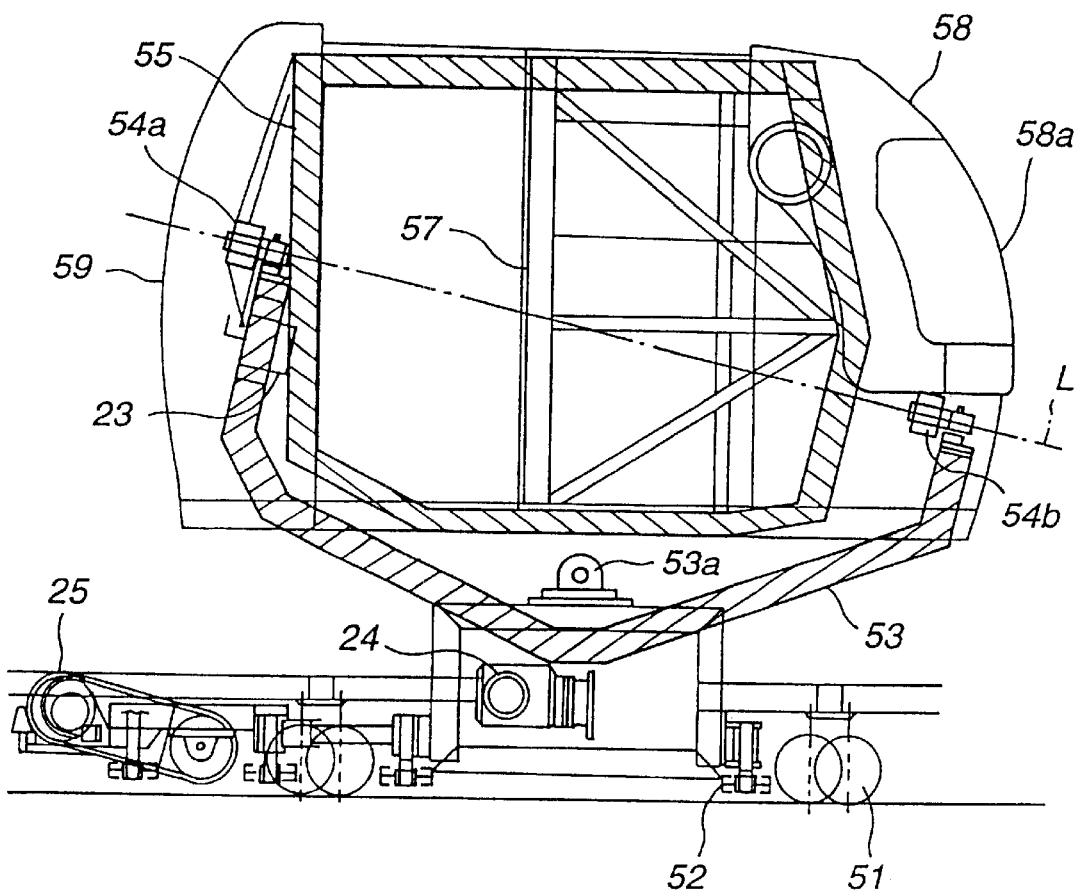
FIG. 2 is a side view of a ride 1 of a first aspect of the embodiment of the present invention.
Figure 3:
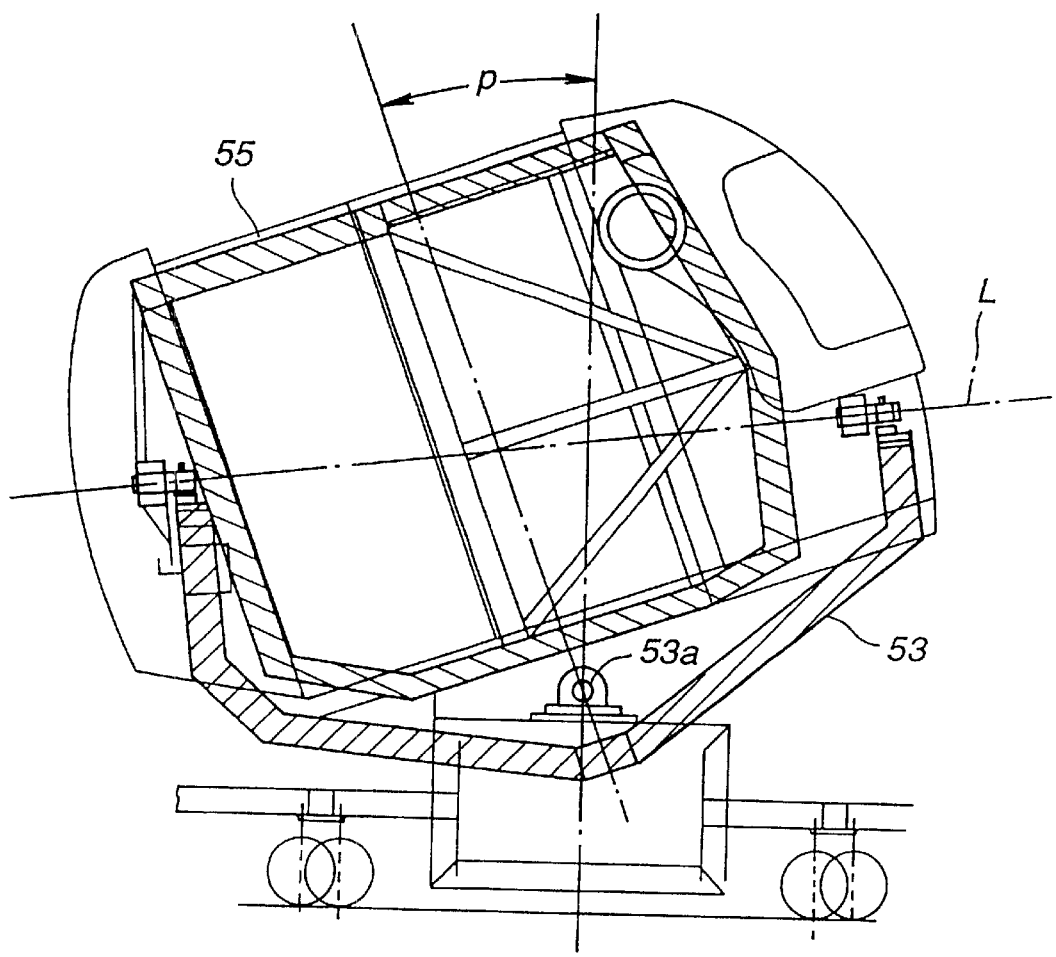
FIG. 3 is a schematic diagram of the rocking of the ride 1 of a first aspect of the embodiment of the present invention.

FIG. 2 is a side view of a ride 1, showing only the principal parts. On the bottom portion of a ride 1, a plurality of wheels 51 are provided for supporting the weight thereof. Further, also provided are a plurality of guide wheels 52 for making contact with a guide (not shown) and moving a ride 1 along a course. The wheels 51, guide wheels 52, and driving motor 25 are provided on a frame. A ride 1 main unit is mounted on top of this frame. The frame 53 is designed to support a ride main unit, and rotates around a supporting point 53a so as to impart a pitching motion to a ride. This state is shown in FIG. 3. Which shows the frame 53 is tilted at an angle p toward the rear around the supporting point 53a.

Figure 4:
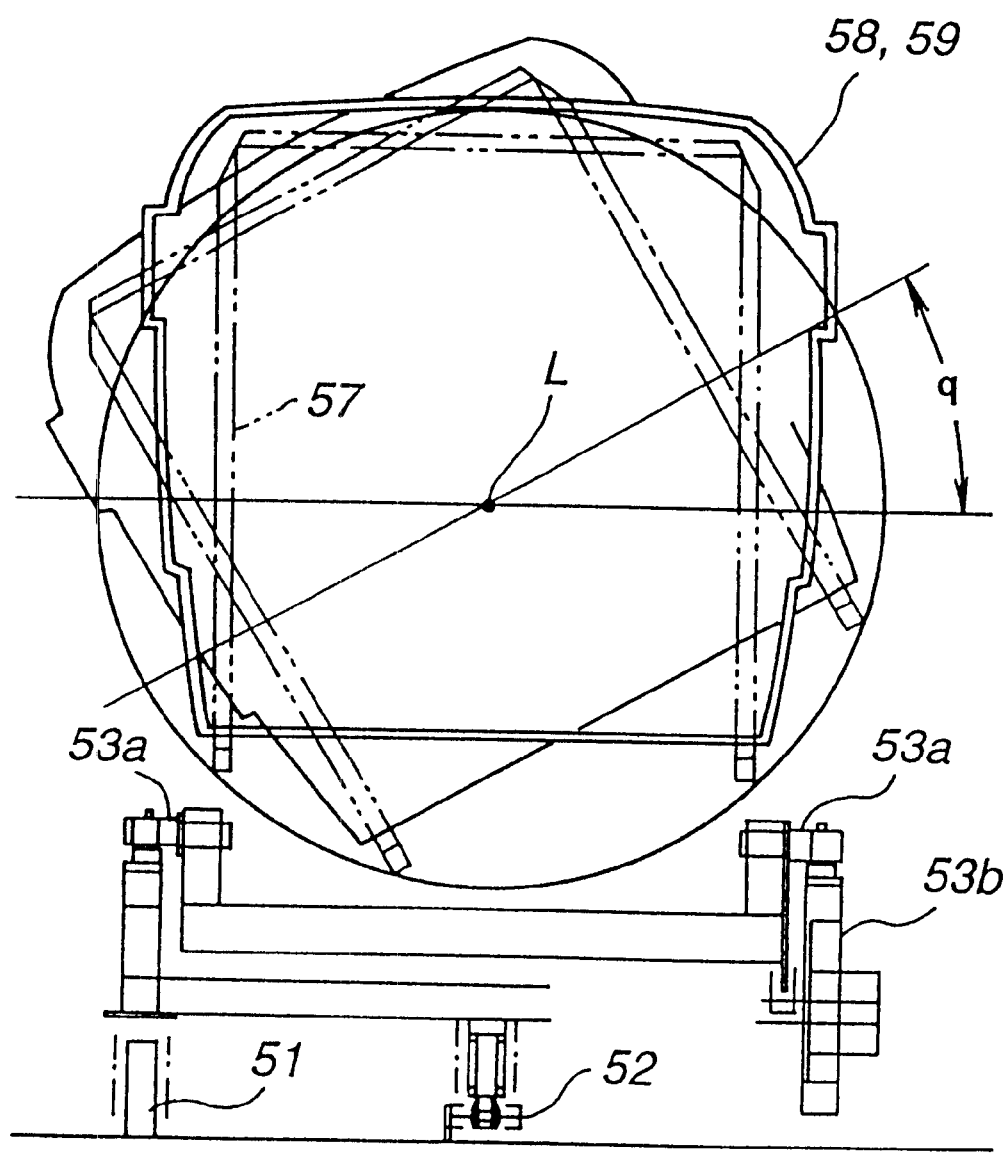
FIG. 4 is a schematic diagram (front view) of the rocking of the ride 1 of a first aspect of the embodiment of the present invention.

Further, a bearing 54a, 54b is provided at both ends of the frame 53, and a frame 55, which is supported in accordance with these bearings so as to rotate around an axis of rotation L, is mounted thereto. In accordance with this constitution, a rolling motion is imparted to a ride. This state is shown in FIG. 4. In this figure, the frame 55 is tilted at an angle q to the left around the axis L. In this manner, a ride of a first aspect of the embodiment of the present invention has two axes of rotation (rolling, pitching), and a predetermined rotation is imparted in accordance with a rolling motor 23 and transmission means 53b, and pitching motor 24, respectively. Furthermore, as can be see from FIG. 2 through FIG. 4, the rolling axis is at the bottom portion of a ride, that is, it is provided below a rider. And the pitching axis is not horizontal, but rather slants downward toward the front. This is for the following reason. A conventional rolling axis passed through the center of a ride, in which case there was no sense of acceleration even when a ride tilted significantly. By contrast to this, moving the rolling axis lower increases centrifugal force, giving one the sensation of being swung around, and heightening a rider's sense of acceleration. Further, the rolling axis was made to slant downward toward the front to give preference to making the line of sight horizontal relative to the configuration with the structure of a concave mirror of the below-described image-projecting optical system. For a rider, it is desirable that the line of sight be horizontal.

Furthermore, this approach is also effective at facilitating the design of the optical system, and at designing the body of equipment to be compact. On the inside of the frame 55 of a ride 1, there is provided a frame 57 for mounting a seat, video projector 15, and the optical system therefor, and on the outside thereof is mounted the exterior covering 58, 59 of a ride 1. A dummy window 58a is provided in the front exterior covering 58, but, as described below, since a concave mirror is provided in front of a rider, the riders cannot see outside through the window 5a.

Figure 5:
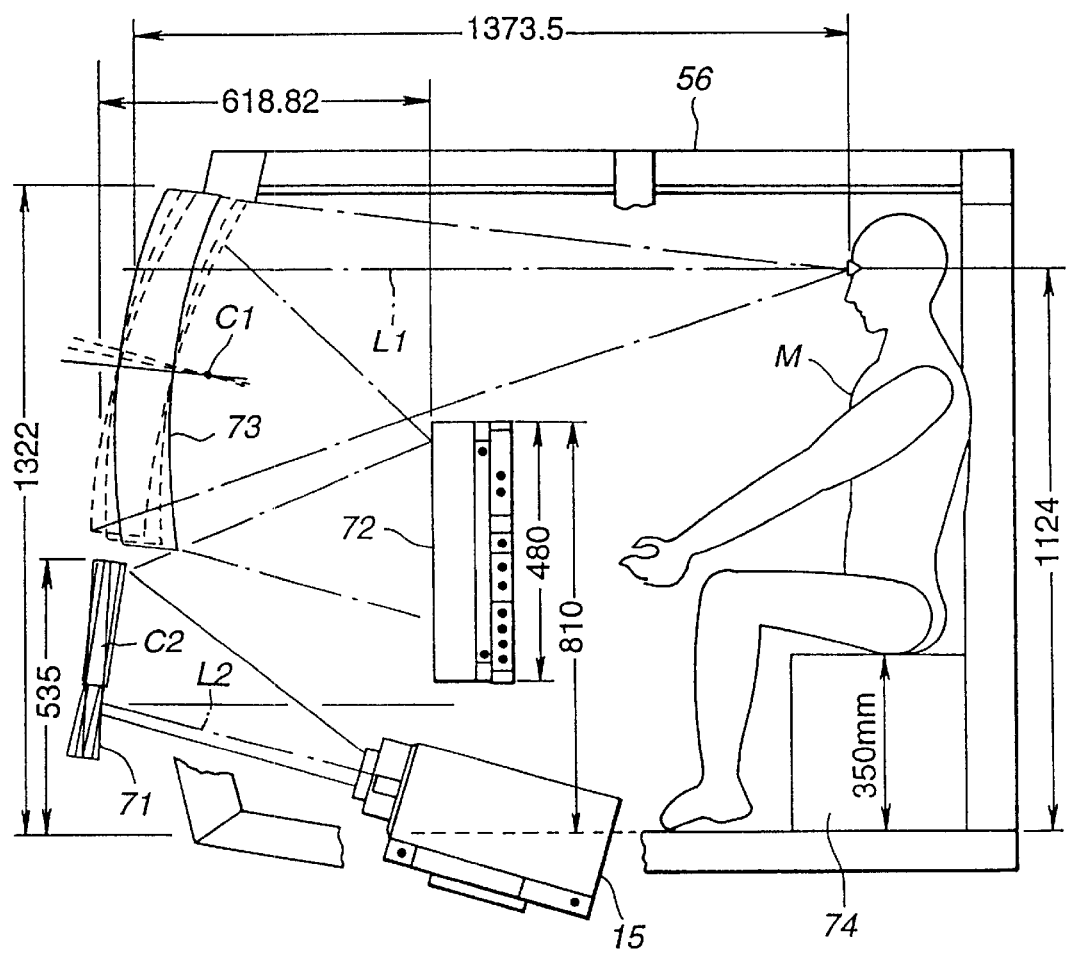
FIG. 5 is a schematic diagram of the constitution of the projection optical system of a first aspect of the embodiment invention.

FIG. 5 is a diagram for illustrating the constitution of the projection optical system of a first aspect of the embodiment of the present invention. This diagram is a side view (perspective view) of a ride 1, and is constituted roughly to scale. The optical axis L2 of a video projector 15 intersects with a slightly lower than center portion of a flat auxiliary mirror 71. The projected light from the video projector 15 is reflected by the auxiliary mirror 71, forming an image on a screen 72. The screen 72 is a cylindrical surface shape. It is not shown in the figure, but when the screen 72 is viewed from above, it forms a circular arc. A rider M views an image on the screen 72 via a concave mirror 73. The line of sight L1 of the rider M is practically horizontal.

The use of a flat mirror as an auxiliary mirror (could just as well have been a concave mirror or a convex mirror) is designed to achieve a folding constitution, which, because the focal distance (distance to the projection surface) of the video projector 15 is relatively long, acquires optical system distance while being housed in a compact body of equipment. To make the imaging system compact and lightweight, the constitution is such that the projector projects an image onto a cylindrical-shaped screen, and a rider views that image via a concave mirror. Using a large cathode ray tube would take up too much space and increase the weight. Further, having a rider view the screen via a concave mirror instead of directly is due to the fact that the pertinent portion is set up as a window 58a, and if this portion were a screen, it would contradict this setup, giving a rider a sense of inconsistency. In this regard, using a concave mirror lessens the sense of inconsistency. Another reason is that in accordance with a constitution, wherein an image projected on a screen is viewed via a concave mirror, ambiance is further heightened by the lens effect/infinity effect thereof. That is, in accordance with the concave mirror, an image is recessed in accordance with a magnifying effect similar to that of a lens, in other words, the image appears distant and life-like (infinity effect).

As for the concave mirror 73, the mirror surface was made by depositing aluminum onto the surface of a resin (acrylic). The surface of the deposited aluminum is on the backside (outside) as viewed by a rider. By contrast, if the deposited surface was on the front, a coating material would be sprayed onto the deposited surface, creating a white layer, which would degrade the characteristics of the mirror and make viewing difficult. Further, in accordance with placing the deposited surface on the outside, since the projected light rays penetrate inside the acrylic, the setup more closely approximates looking outside through a window. The thickness of the concave mirror 73 is set at 5 mm. If the acrylic is thick, light is reflected irregularly thereinside, causing glare. Conversely, if the acrylic is thin, the mirror itself will warp, and the image will become deformed and hard to see. When a concave mirror is used to create a virtual image, the deformation thereof is especially problematic. Accordingly, a thickness of 5 mm was used, and this was judged to be the most suitable. Further, since a seat is provided so that two people can sit side-by-side in a ride, as a concave mirror 73, a large concave mirror is used rather than one for individual use. More specifically, the aspect ratio is 1:2, and is a size, which is capable of ensuring a sufficiently wide angle of view that is not tiring to two riders when the two riders are sitting side-by-side.

Since the auxiliary mirror 71 rotates, having its center C2 as an axis, it is possible to adjust the projection location. Similarly, since the concave mirror 73 rotates, having its center C1 as an axis, it is possible to adjust the viewing position of a rider.

Figure 6:
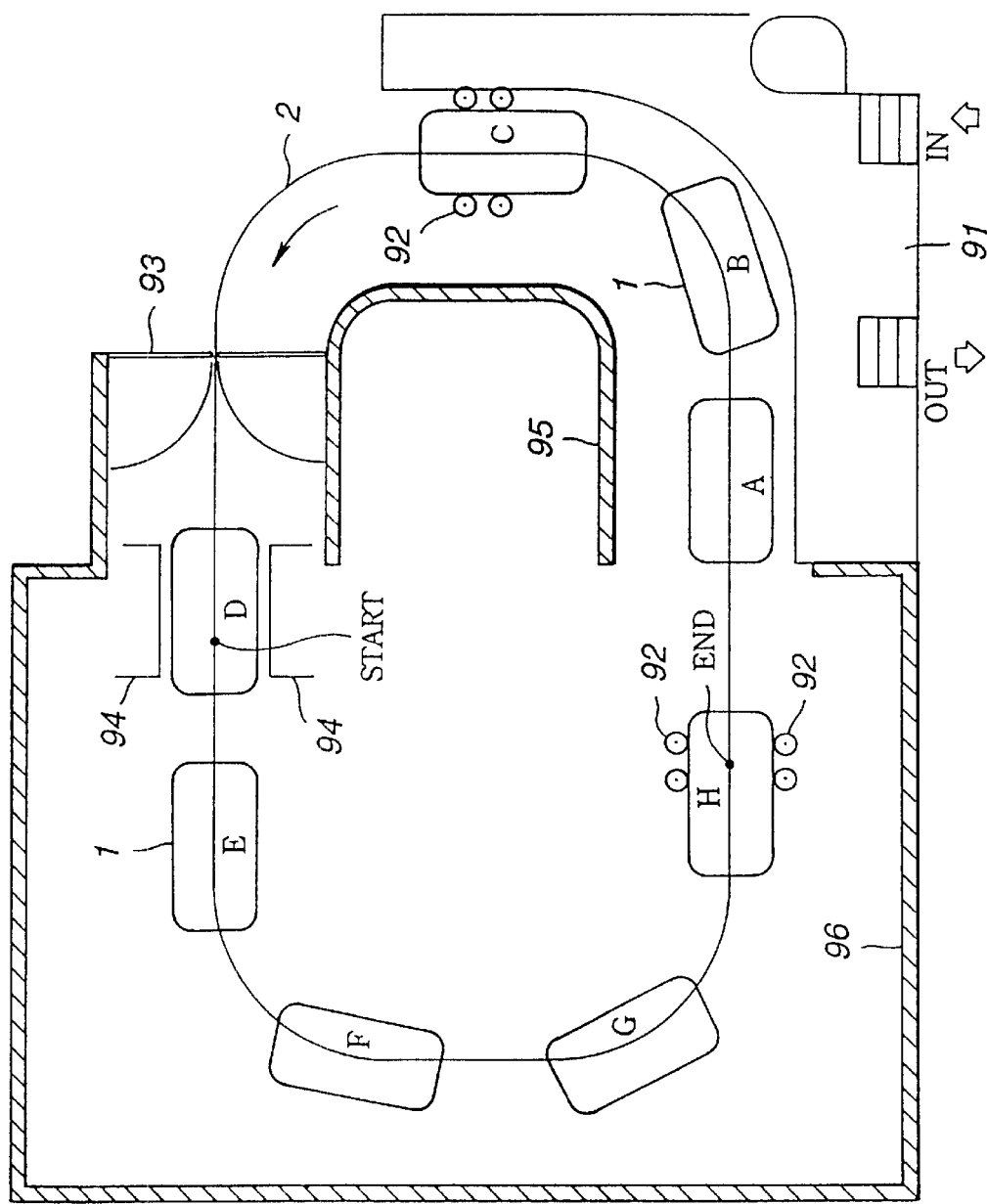
FIG. 6 is a rough plan view of an amusement facility of a first aspect of the embodiment of the present invention.

FIG. 6 is a rough plan view of an amusement facility of a first aspect of the embodiment of the present invention. A ride 1 moves over a course 2. In this figure, eight rides A–H are depicted for explanation purposes, but in accordance with the length of the course 2, and a facility's ability to attract riders, one ride or a plurality of rides (for example, six rides) is also possible. This amusement facility is broadly divided into two area, a bright outside portion, and a dark inside portion surrounded by walls 95, 96. The area of rides A–C of this figure is the outside area, and the area of rides D–H is the inside area.

The operation of this amusement facility is described next. A rider gets on a ride at the ride B location. The ride travels slowly (approximately 10 cm/s) on its own power in accordance with a driving motor 25.

At the ride C location, the ride is suddenly accelerated in accordance with a rotating roller or other acceleration means 92, which make contact with the frame of the bottom portion of the ride. The driving motor 25 and drive shaft are disconnected at this time in accordance with the operation of a clutch 26. As the ride approaches an automatic door 93, the automatic door 93 opens, allowing the ride into the dark inside area. During this interval, an image of the outside taken by a video camera 11 is projected onto the screen and other image providing means of the inside of the ride.

In the ride D location, the ride is suddenly decelerated in accordance with decelerating means 94. Then, switch 13 switches over, and an image of the video disk player 34 is projected, onto the screen on the inside of the ride. A game starts at the START location of FIG. 6.

At the ride E-ride G locations hereinafter, the game progresses as the ride travels slowly under its own power. At the ride H location, the ride is once again accelerated in accordance with acceleration means 92, and exits to the outside area. The game ends at the END location of FIG. 6, and an image of the outside is projected once again. The rider gets off at the ride A location.

The characteristic features of this amusement facility are a two-person, self-propelled motion ride (bending the rail enables tilting in the yaw direction); the initial sense of acceleration, followed by a reduction of speed when it becomes dark, and the movement of the ride at an ant's pace thereafter (the rocking of the ride keeps the rider from noticing this); the re-acceleration near the exit, and exiting to the outside; the switching over of the camera image at the START and END points; and the acceleration at image switchover. These serve to enhance ambiance, and to dramatize a rider's sense of expectation upon entering the dark portion. To control these characteristics, the image is synchronized with the location of the ride, and mechanical switches are provided at predetermined locations of the course 2 (for example, at the portion at which the ride enters The dark place).

INDUSTRIAL APPLICABILITY

According to the above-mentioned constitution, the following effects occur. In accordance with the initial sense of acceleration at the ride C location, a rider does not realize the ride is moving extremely slowly following deceleration at the ride D location. This holds especially true since the ride is being rocked up and down, and side to side. Therefore, this motion coupled with the image being projected onto the screen, gives a rider the impression that the travel distance is much longer than it actually is, and furthermore, that the travel speed is much faster than it actually is.

Further, amusement facility space can be saved. When viewed overall, since a conventional ride system does not create an illusion in a rider's mind, the size of the system itself must be made larger to a certain extent, and this raises the costs of securing a site and constructing the buildings. According to an amusement facility of a first aspect of the embodiment of the present invention, (1) a portion of the ride system is darkened so that the whole system cannot be seen; (2) the darkness is used to create an illusion in the mind of the rider; and (3) in accordance with the mutual and organic combination of ride motion, sudden acceleration, deceleration, the switch to darkness, and ride rocking, an illusion is created in the mind of a rider (from the perspectives of distance and speed). Therefore, an amusement facility, which furnishes a rider with a high degree of satisfaction, can be provided without increasing manufacturing/construction/installation costs.

What is claimed is:

1. An amusement facility including an image projecting device, which provides a rider inside an amusement ride with a predetermined image based on a scenario as said amusement ride for riders travels a previously-determined course, wherein said course of said amusement facility comprises a first area and a second area, the first area having relatively greater light than said second area, and wherein in said first area, a rider is provided by the image projecting device with an image of outside of said amusement ride, and in said second area, a rider is provided by the image projecting device with a previously-determined image, said first area is an area in which a rider can acquire visual information from the outside world, and said second area is an area in which a rider is prevented from acquiring visual information from the outside world.

2. The amusement facility according to claim 1, further comprising a ride drive controller changing the speed of said amusement ride between said first area and said second area in accordance with said amusement ride accelerating when in said first area, and said amusement ride decelerating when transitioning from said first area to said second area.

3. The amusement facility according to claim 2, wherein the difference between the speed in said first area and the speed in said second area, and the degree of said acceleration and the degree of said deceleration are set to a level by the ride drive controller, which gives a rider the impression that said amusement ride moved a greater distance that the actual distance in said second area.

4. The amusement facility according to claim 2, characterized in that said amusement ride accelerates when returning from said second area to said first area.

5. The amusement facility according to claim 2, further comprising a door between said first area and said second area, wherein said door opens when said amusement ride approaches, and said amusement ride passes through said door when transitioning from said first area to said second area.

6. The amusement facility according to claim 1, characterized in that said first area is an area, which is bright enough that a rider can see the outside world, and said second area is an area, which is so dark that a rider cannot see the outside world.

7. The amusement facility according to claim 1, characterized in that said first area is an area in which said amusement ride can be seen by a person located outside of the amusement facility, and said second area is an area in which said amusement ride cannot be seen by the person outside of the amusement facility.

8. The amusement facility according to claim 1, in which said amusement ride comprises a body of equipment, which is sealed relative to the outside so that said rider is not able to see directly outside said amusement ride.

9. The amusement facility according to claim 8, at said body of equipment of which having image providing circuits, which are constituted so that in said first area a rider is provided with an image of outside this body of equipment taken by a camera, and so that in said second area this rider is also provided with a game image.

10. An amusement facility ride, which is provided so as to move parallel to a signal wire, and which comprises:

a receiving device for receiving a modulated signal in a non-contact manner;

a demodulator for demodulating a signal received via said receiving device;

an amplifier for amplifying an image signal demodulated by said demodulator;

a display device for receiving the output of said amplifier, and displaying an image:

a camera provided with the amusement facility ride and filming the outside; and a switch for selecting either an image of said camera, or an image signal of said demodulator, and outputting the selected image to said amplifier.

11. An amusement facility ride comprising:

a driving device for self propulsion;

a rolling device for rocking a rider from left to right relative to the direction of travel; and a pitching device for rocking a rider up and down in the direction of travel; wherein the rolling axis of said rolling device slants downward towards the front in the direction of travel.

12. The amusement facility ride according to claim 11, characterized in that the pitching axis of said pitching device is located lower than a rider.

13. An amusement facility display device, comprising:

a video projector;

a screen onto which an image is projected and displayed in accordance with said video projector; and a concave mirror, which is provided in front of a rider, and a rider views an image on said screen via said concave mirror; wherein said screen has a cylindrical surface when viewed from above.

14. The amusement facility display device according to claim 13, characterized in that said concave mirror comprises a transparent layer, and deposited on the surface thereof a metallic layer, which reflects light, and said metallic layer is provided on the opposite side of a rider, and a rider receives light that passes through said transparent layer.

15. The amusement facility display device according to claim 14 characterized in that the transparent layer of said concave mirror is 5 mm thick.

16. The amusement facility display device according to claim 13, comprising an auxiliary mirror between said video projector and said screen.

17. The amusement facility display device according to claim 13, characterized in that said concave mirror comprises a shape, which imitates a ride window.

18. The amusement facility display device according to claim 17, characterized in that the line of sight of a rider relative to said concave mirror is practically horizontal.

* * * * *